United States Patent
Stellwag et al.

(10) Patent No.: US 8,774,341 B2
(45) Date of Patent: Jul. 8, 2014

(54) BOILING WATER REACTOR NUCLEAR POWER PLANT WITH ALCOHOL INJECTION

(75) Inventors: Bernhard Stellwag, Nuremberg (DE); Mihai G. M. Pop, Lynchburg, CA (US)

(73) Assignees: AREVA Inc., Lynchburg, VA (US); AREVA NP GmbH, Erlangen, DE (US)

(*) Notice: Subject to any disclaimer, the term of this patent is extended or adjusted under 35 U.S.C. 154(b) by 1106 days.

(21) Appl. No.: 11/904,657

(22) Filed: Sep. 28, 2007

(65) Prior Publication Data
US 2009/0086878 A1    Apr. 2, 2009

(51) Int. Cl.
| G21C 1/04 | (2006.01) |
| G21C 17/022 | (2006.01) |
| G21C 9/00 | (2006.01) |
| G21C 19/307 | (2006.01) |

(52) U.S. Cl.
CPC ....... *G21C 17/0225* (2013.01); *G21Y 2002/103* (2013.01); *Y02E 30/40* (2013.01); *Y02E 30/39* (2013.01); *G21Y 2004/40* (2013.01); *G21C 19/307* (2013.01)
USPC ............................ 376/347; 376/305; 376/306

(58) Field of Classification Search
CPC ....................... G21C 17/0225; G21Y 2002/103
USPC .................................................. 376/305, 347
See application file for complete search history.

(56) References Cited

U.S. PATENT DOCUMENTS

| 5,398,269 | A | * | 3/1995 | Nagase et al. | 376/306 |
| 5,600,692 | A | * | 2/1997 | Hettiarachchi | 376/305 |
| 5,728,858 | A | * | 3/1998 | Lewis et al. | 556/470 |
| 6,793,883 | B2 | * | 9/2004 | Andresen et al. | 422/7 |
| 6,940,939 | B1 | * | 9/2005 | Ichikawa et al. | 376/305 |
| 2005/0018805 | A1 | * | 1/2005 | Ishida et al. | 376/305 |
| 2005/0135542 | A1 | * | 6/2005 | Stellwag et al. | 376/277 |

FOREIGN PATENT DOCUMENTS

JP      2006201000 A     8/2006

OTHER PUBLICATIONS

Electrochemical Potential Measurments on Zircaloy-2, Nuclear Power Program, Dec. 2003.*

* cited by examiner

*Primary Examiner* — Frank J McGue
(74) *Attorney, Agent, or Firm* — Davidson, Davidson & Kappel, LLC

(57) ABSTRACT

A nuclear power plant is provided including a BWR, a reactor cooling system cooling the BWR, an HWC hydrogen injection system connected to the reactor cooling system and an alcohol injection system connected to the reactor cooling system. Methods for providing methanol and hydrogen are also provided.

21 Claims, 4 Drawing Sheets

Quantities of Hydrogen and Methanol to Provide Effect of 1.2 ppm Hydrogen in the BWR 900MWe Reactor Core

| | Hydrogen mg/kg | Hydrogen mg/kg | Hydrogen mg/kg | Diff-H2 mg/kg | Equivalent Methanol | Methanol mg/kg | Methanol mg/kg | Methanol mg/kg |
|---|---|---|---|---|---|---|---|---|
| X-axis | FC | RC | CC | dCC | dCC | FC | RC | CC |
| | 1 | 2 | 3 | 4 | 5 | 6 | 7 | 8 |
| 0.0 | 1.20 | 0.0067 | 0.1772 | 0.0000 | 0.000 | 0.000 | 0.000 | 0.000 |
| 0.1 | 1.10 | 0.0062 | 0.1624 | 0.0148 | 0.078 | 0.146 | 0.066 | 0.078 |
| 0.2 | 1.00 | 0.0056 | 0.1477 | 0.0295 | 0.156 | 0.293 | 0.133 | 0.156 |
| 0.3 | 0.90 | 0.0051 | 0.1329 | 0.0443 | 0.235 | 0.442 | 0.201 | 0.235 |
| 0.4 | 0.80 | 0.0045 | 0.1181 | 0.0591 | 0.313 | 0.588 | 0.267 | 0.313 |
| 0.5 | 0.70 | 0.0039 | 0.1034 | 0.0738 | 0.391 | 0.735 | 0.334 | 0.391 |
| 0.6 | 0.60 | 0.0034 | 0.0886 | 0.0886 | 0.469 | 0.881 | 0.400 | 0.469 |
| 0.7 | 0.50 | 0.0028 | 0.0738 | 0.1034 | 0.548 | 1.029 | 0.468 | 0.548 |
| 0.8 | 0.40 | 0.0022 | 0.0591 | 0.1181 | 0.626 | 1.175 | 0.534 | 0.626 |
| 0.9 | 0.30 | 0.0017 | 0.0443 | 0.1329 | 0.704 | 1.322 | 0.601 | 0.704 |
| 1.0 | 0.20 | 0.0011 | 0.0295 | 0.1477 | 0.782 | 1.469 | 0.668 | 0.782 |
| 1.1 | 0.10 | 0.0006 | 0.0148 | 0.1624 | 0.861 | 1.617 | 0.735 | 0.861 |
| 1.2 | 0.00 | 0.0000 | 0.0000 | 0.1772 | 0.939 | 1.763 | 0.801 | 0.939 |

FIG. 3

BOILING WATER REACTOR NUCLEAR POWER PLANT WITH ALCOHOL INJECTION

The present invention relates generally to nuclear power plants and more particularly to nuclear power plants with boiling water reactors (BWRs).

BACKGROUND

Oxidation caused by oxidants such as oxygen and hydrogen peroxide in the cooling water of BWRs can cause stress corrosion cracking (SCC) on reactor components, and cause corrosion of the zirconium alloy cladding of the fuel pins. Known SCC reduction strategies for reactor components such a reactor pressure vessel (RPV) internals of BWRs include noble metals chemistry addition (NMCA) and hydrogen water chemistry (HWC). These SCC reduction strategies can reduce SCC of internals, but may increase corrosion of the fuel pin cladding.

NMCA methods are described for example in U.S. Pat. Nos. 5,818,893, 5,904,991 and 6,793,883, and as defined herein NMCA may include both off-line or on-line addition of noble metals.

HWC used with NMCA is described in the background section of U.S. Patent Application Publication No. 2005/0018805, which then also describes application of a reductive nitrogen compound such as hydrazine in combination with hydrogen. Application of an alcohol such as methanol with hydrazine is also disclosed. DE 100 30 726 describes application of photocatalytic substances for depositing on reactor internals, and mentions the injection of hydrogen or methanol.

Application of methanol to reduce oxidizing effects is described in U.S. Patent Application Publication No. 2005/0135542, as well as in the publication entitled "Study of the Methanol Injection in Reactor Water in Reactor Water of BWR Plants" by Saneshige et al. presented at the Proc. Symp. on Water Chemistry and Corrosion of Nuclear Power Plants in Asia, Oct. 11-13, 2005, Gyeongju, Korea.

Shut down and then start-up of BWRs can occur at regular intervals, for example, every one to three years, and present very different water chemistries than during normal operation. As discussed, for example, in the publication "The First Application of Hydrogen Water Chemistry during Start-up for Mitigation of SCC initiation in Tokai-2 BWR" by Takiguchi and Otoha, oxidant concentration in reactor water is high during start-up. The publication describes the addition of HWC during start-up via an additional hydrogen injection system.

U.S. Patent Publication No. 2005/0018805 also describes adding hydrogen and a reductive nitrogen compound during start-up and shut-down.

SUMMARY OF THE INVENTION

While the use of HWS during start up is known, this procedure has several drawbacks. Contact of the hydrogen with air pockets which can be present during start-up needs to be avoided to prevent the possibility of an explosive reaction. In addition, the use of HWC during start-up has several other drawbacks listed in the publication "The First Application of Hydrogen Water Chemistry during Start-up for Mitigation of SCC initiation in Tokai-2 BWR" such as not being able to maintain a proper target concentration during certain start-up operation conditions. The varying conditions during both start-up and shut-down, such as a varying amount of coolant circulating through the reactor and varying reactor temperatures, thus make proper dosing of gaseous hydrogen exceedingly difficult. Furthermore, hydrogen injection may not be possible at other times, for example during repair or malfunction.

Noble metals often also begin to have reduced effect as catalysts during certain periods, for example, when operating at temperatures of 250 degrees Celsius or below and when hydrogen injection is not available. During start-up and shut-down temperatures fall below these levels and hydrogen injection is complex.

An object of invention is to reduce oxidation and reduce corrosion on reactor core components and fuel claddings during periods when HWC is not available or desirable, for example, during malfunction of the HWC injection system or start-up and shut-down of the reactor. Another alternate or additional object of the present invention is to provide for safer, less expensive and/or less complex oxidation reduction.

The present invention provides a nuclear power plant including a BWR, a reactor cooling system cooling the BWR, an HWC hydrogen injection system connected to the reactor cooling system, and an alcohol injection system connected to the reactor cooling system.

By providing a separate alcohol injection system in addition to the hydrogen injection system, the use of hydrogen or alcohol for various operating regimes, for example, during start-up and shut-down as opposed to normal operating conditions, advantageously can be controlled. Alcohol as well advantageously can be provided as a back-up injection system at times when the hydrogen injection system is inoperable or otherwise not available. The use of alcohol, which can be provided in liquid form and does not explode when in contact with air pockets, also advantageously improves safety, requires less careful monitoring and requires less complex delivery equipment.

Additional components, such as a reductive nitrogen compound injection system, and NMCA injection system advantageously can be provided as well.

The present invention also provides a method for operating a nuclear power plant including providing an alcohol to a BWR during start-up or shut-down operation.

Alcohol has typically not been considered suitable for start-up or shut-down, since, as described in U.S. Patent Publication No. 2005/0188805, the radiation levels during start-up and shut down were at lower intensities and alcohols were generally considered useful when gamma radiation was present. However, the present invention recognizes that using alcohol instead of HWC during start-up or shut-down advantageously permits some oxidation reduction, while reducing dangers related to explosions and simplifying equipment requirements. The additional alcohol injection system may be added on to existing BWR nuclear power plants or provided to new power plants, and may be connected to the primary coolant in the reactor via, for example, the reactor water clean up system (CUW), emergency core cooling system (ECCS), primary loop recirculation system (PLR), or control rod drive cooling system (CLD).

Advantageously, hydrazine or another reductive nitrogen compound can be provided to the BWR primary cooling circuit at the same time as the alcohol and hydrogen to improve the overall oxidation reduction performance of the additives.

The present invention also provides a method for operating a nuclear power plant including providing both hydrogen and an alcohol to a BWR primary cooling circuit during normal operation of the power plant.

In the past, methanol was seen as an alternative to hydrogen. By providing both hydrogen and methanol, the mixture of hydrogen and methanol can be altered as desired to provide adequate oxidation reduction. Moderate negative electrochemical potential values can be achieved (slightly below −240 mV), while still providing oxygen reducing species of both types. Moreover, back-up protection can thus be provided, for example when the amount of stored hydrogen for HWC is running low, or the hydrogen injection fails, methanol can be dosed with the hydrogen to reduce the amount of hydrogen being used.

BRIEF DESCRIPTION OF THE DRAWINGS

A preferred embodiment of the present invention will be described with respect to the drawing in which:

FIG. 3 shows quantities of hydrogen and methanol to provide an equivalent effect of 1.2 ppm hydrogen in a BWR 900 MWe reactor core.

DETAILED DESCRIPTION OF A PREFERRED EMBODIMENT

Figure 1:
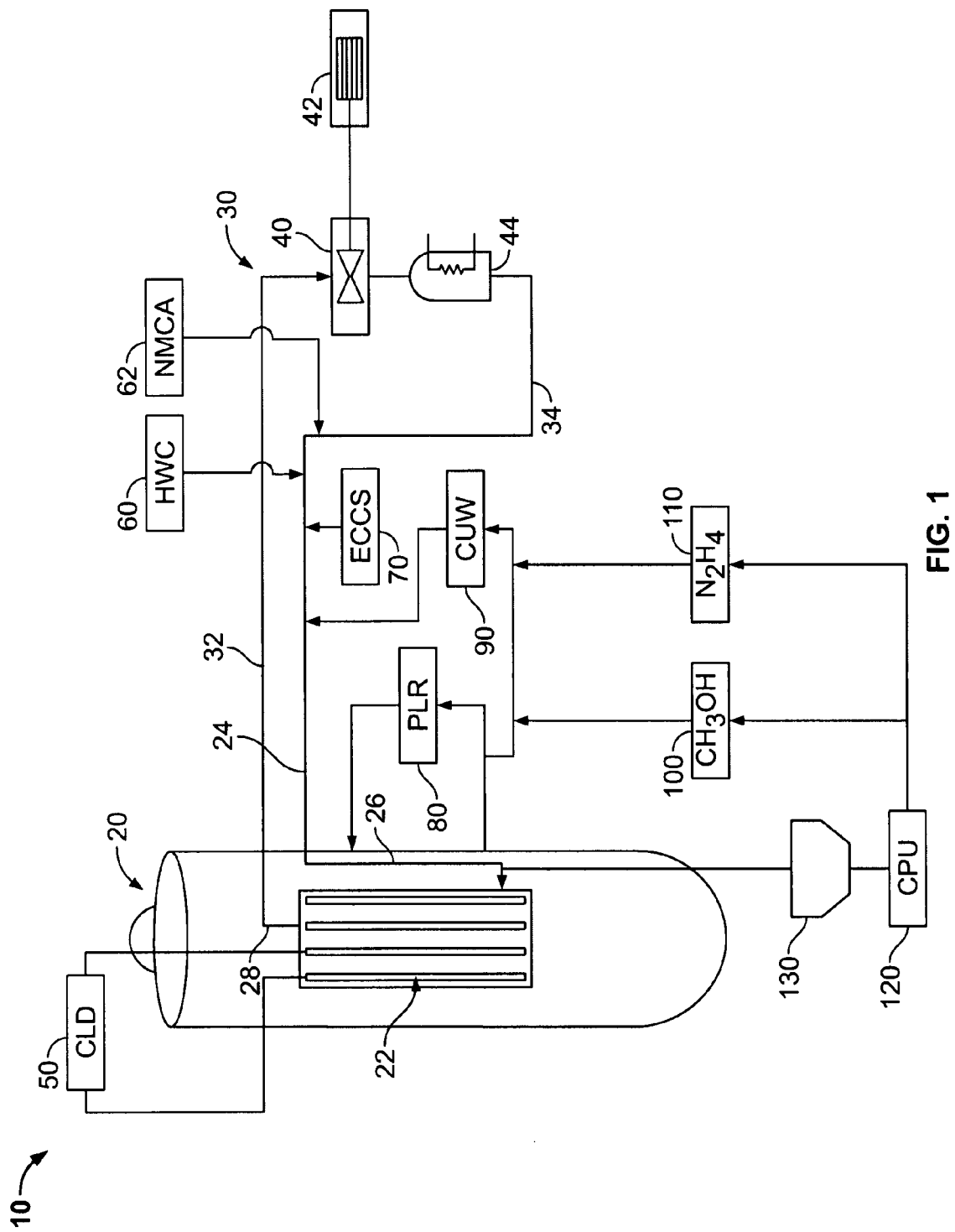
FIG. 1 shows one embodiment of a nuclear power plant according to the present invention.

FIG. 1 shows schematically one preferred embodiment of a BWR nuclear power plant 10 according to the present invention. Nuclear power plant 10 has a BWR 20 having a core 22 with a plurality of fuel rods having, for example, uranium dioxide fuel in zirconium alloy tubes, a downcomer 26 and a riser 28, shown schematically. Downcomer 26 is connected to a primary coolant inlet 24, which receives water from a primary coolant line 30. Core 22 heats water from the primary coolant line 30, which has a hot leg 32 providing steam to a turbine 40 driving a generator 42. A condenser 44 condenses the steam into water, which exits the condenser into a cold leg 34 of coolant line 30, and is pumped back to the inlet 24 and downcomer 26.

A control rod drive cooling system (CLD) 50 can be provided to cool a drive for control rods inserted into core 22. An HWC hydrogen injector 60 can inject hydrogen into cold leg 34, and an NMCA injector 62 can provide a noble metal for example, platinum, into cold leg 34 as well, so that the reactor 20 experiences HWC and NMCA during normal periods of operation.

An ECCS 70, PLR 80 and CUW 90, all shown schematically, may also be provided.

The specific embodiment of FIG. 1 provides a methanol injector 100 and a hydrazine injector 110, which are connected to CUW 90 for example, downstream of a CUW pump. Methanol and hydrazine thus can be injected into water entering cold leg 34 of primary coolant line 30 via CUW 90, and can circulate through reactor 20. Cooled down CUW sample lines can also be used to receive injector 100, 110 fluids. Injectors 100, 110 also could be located at the ECCS 70, PLR 80 or CLD 50. Alternately, an existing injector, such as one used for sodium-24 injection and connected to CUW 90, could also be modified to use as an injector 100 or 110. The preferred location is past any resin beds.

The amount of methanol and hydrazine injected can be controlled by a controller 120, which can receive an input from one or more sensors 130, for example, monitoring the concentration of methanol, hydrazine or hydrogen in downcomer 26. Pre-set quantities of methanol can be injected considering for example hydrogen values in downcomer 26. Sensors 130 can also measure an electrochemical potential (ECP) of one or more components of reactor 20 or core 22, for example the cladding of the fuel pins.

Figure 2:
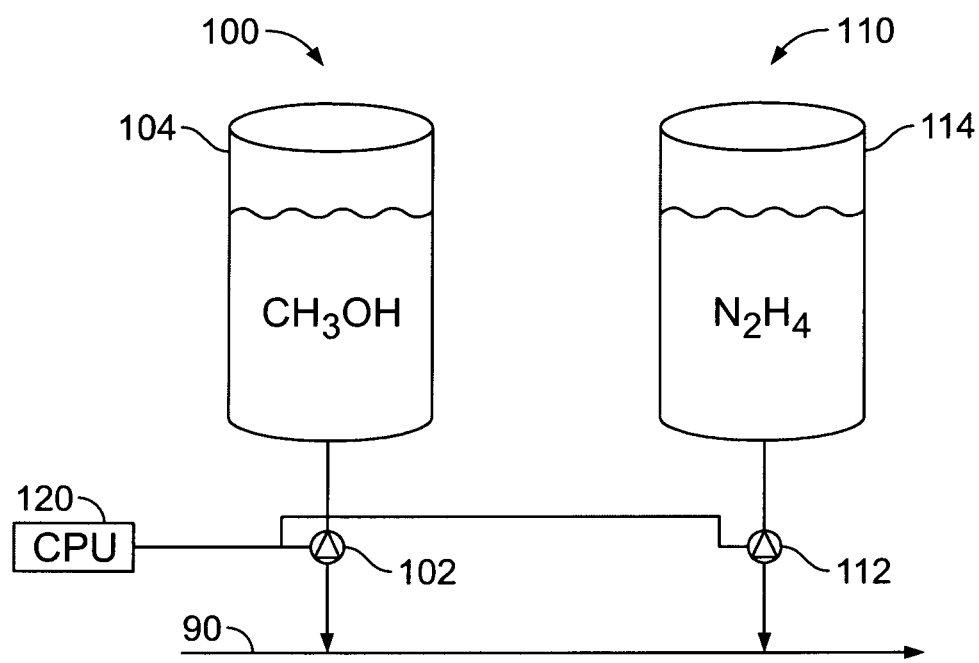
FIG. 2 shows more details of hydrazine and methanol injectors of the embodiment of FIG. 1.

FIG. 2 shows one embodiment of methanol injector 100 and hydrazine injector 110, which can include tanks 104, 114, respectively, connected to piping of CUW 90. Metering pumps 102, 112 can release, respectively, methanol and/or hydrazine into CUW 90, and can be controlled individually via controller 120. Controller 120 can be the same controller controlling start-up and shut-down operations or a separate controller. Alternatively, in a gravity-assisted injector embodiment, the amount of methanol or hydrazine provided can be controlled by turning on and off the valves, with the tanks suspended above the piping.

While methanol is preferred, other alcohols may be delivered, including ethanol and propanol, which are also preferred. However, formic acid, formaldehyde and acetaldehyde are other examples of suitable alcohols.

While hydrazine is the preferred reductive nitrogen compound, other compounds such as ammonia ($NH_3$) are also possible.

In one preferred method of the present invention, alcohol is injected into the primary coolant to establish an alcohol concentration from 0.1 to 300 μmol/kg (≈0.0032 to 9.6 ppm for methanol) in downcomer 26 during start-up or shut down, or during another time when HWC 60 is not operating, for example when HWC is malfunctioning. Most preferably, the alcohol concentration is less than 10 μmol/kg.

The hydrazine also is preferably provided during shutdown and start-up into the primary coolant to establish a maximum hydrazine concentration of 300 μmol/kg in downcomer 26.

In another preferred method of the present invention, it is advantageous to use both hydrogen and methanol injection during normal operation. It is also possible to use all of the hydrogen-containing chemical injectors, such as for hydrogen, methanol and hydrazine, at the same time. The various hydrogen containing chemical injectors can be phased in or phased off due to various phases of operation. Preferably, the combination of the hydrogen containing chemicals added should, stoichimetrically equivalent with respect to hydrogen, be maintained around or below the equivalent of 10 μmol/kg methanol. The metering-in of hydrogen or alcohol or hydrazine, after exceeding a certain limit may lead to several disadvantageous results, and thus most preferably the limit of all of the injected hydrogen-containing chemicals does not exceed the equivalent of 300 μmol/kg methanol FIG. 3 presents the quantities of methanol to be injected in feed-water of a 900 MW electric standard BWR during normal operation so that the effect in the reactor core would be the one provided by an injection in feed water of 1.2 ppm hydrogen. It is an illustration of stoichiometric calculations involving only two components: methanol and hydrogen. Diffusion of hydrogen in the downcomer and carry over of hydrogen by steam are considered in the calculations of FIG. 3. Column 1 thus is the feed-water concentration FC of hydrogen provided by HWC 60, column 2 the predicted downcomer concentration RC during normal operation, and column 3 the predicted core concentration CC of hydrogen during normal operation. Column 4 shows the differential hydrogen predicted as missing from the core as the hydrogen concentration in the feed water decreases and column 5 the equivalent methanol which must be provided to compensate. Columns 6, 7 and 8 then show the desired methanol concentrations in the feed water, downcomer and core respectively to stoichimetrically compensate for the reduced hydrogen injection by HWC 60. Similar calculations can be performed when three or more components are involved and one is replacing the other in successive steps (when one decreases another one increases).

In addition, methanol is more effective than hydrogen in reduction hydrogen peroxide concentrations and in producing negative ECP values, as discussed in, for example, the publication "Reasons and Criteria for Selection of Methanol as an Alternative to Hydrogen for BWR Plants" presented at the 5th International Workshop on LWR Coolant Water Radiolysis and Electrochemistry, San Francisco, October 2004 by Bernhard Stellwag and Wilfried Ruehle, hereby incorporated by reference herein. Experimental data in radiation field shows that the hydrogen peroxide is about a factor of two lower with methanol than with hydrogen at the same molal oxygen ratios. Also, the methanol is about three times more effective than hydrogen to reach the same ECP as a function of oxygen molal ratio.

Sensors 130 could be provided to ensure exact downcomer concentrations RC via monitoring of the hydrogen and the methanol concentrations in the downcomer 26.

Examples of preferred mixed use, with three injectors 100, 110, 60 include:

A. injection of methanol at a constant level, while increasing hydrazine injection and decreasing hydrogen injection (shut-down);

B. methanol and hydrazine injection both increasing while hydrogen injection is absent (beginning of start-up);

C. methanol injected at a constant level with hydrazine still increasing and hydrogen injection absent (end of start-up);

D. methanol injection constant with hydrazine decreasing and hydrogen increasing (beginning of normal operation of HWC or NMCA);

E. methanol injection increasing or decreasing to compensate for loss of hydrogen injection during normal operation; and F. methanol injection increasing or decreasing to compensate for effects on ECP during on-line NMCA injection.

Figure 4:
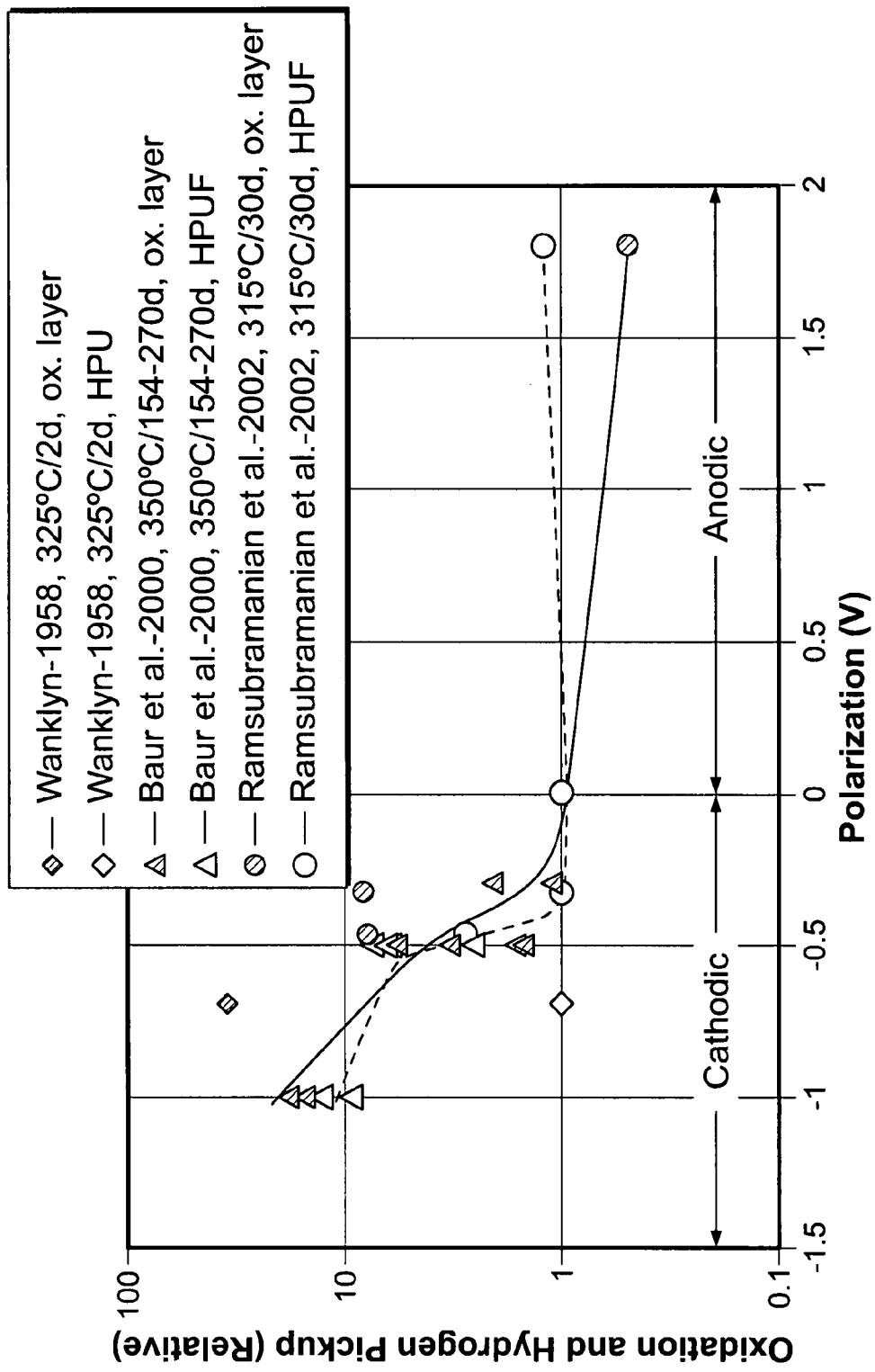
FIG. 4 shows the effect of polarization on oxidation and hydrogen pick-up (HPU) of zirconium in water at 315-350° C.

In FIG. 4, a large body of research is summarized showing that zirconium hydrogen pick-up (HPU) or hydrogen pick-up fraction (HPUF) and oxidation increases dramatically, if the ECP of the fuel pin becomes cathodic (negative) and goes below −300 mV. ECP levels of −300 mV or higher thus are preferred as far as fuel operation is concerned. The concentration in feed-water of the combinations of all reducing agents (hydrogen+methanol+hydrazine) applied to a BWR can be such to provide a reducing environment characterized by an ECP potential against the Pt (platinum) reference electrode around or higher than −300 mV (e.g. −260 mV). To protect both the BWR reactor internals and also maintain an increase fuel operation margin, ECP potential against the Pt (platinum) reference electrode around or higher than −300 mV (e.g. −260 mV), preferably should be maintained, rather than −500 mV usually imposed by operators to minimize the SCC of internals.

In the present invention, it is preferable to use methanol. Alternatively, other suitable alcohols may be used including, for example, ethanol or propanol, or a mixture of any of these.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A nuclear power plant comprising:
a boiling water reactor;
a reactor cooling system cooling the boiling water reactor;
an hydrogen water chemistry hydrogen injection system connected to the reactor cooling system;
an alcohol injection system connected to the reactor cooling system;
a controller, the controller connected to the alcohol injection system and controlling the alcohol injection system, the controller being used during the start-up and shut-down of the boiling water reactor.

2. The nuclear power plant as recited in claim 1 wherein the alcohol is methanol.

3. The nuclear power plant as recited in claim 1 wherein the alcohol includes at least one selected from a group including methanol, ethanol and propanol.

4. The nuclear power plant as recited in claim 1 wherein the boiling water reactor includes a downcomer, the alcohol injection system providing alcohol to the downcomer and the hydrogen water chemistry hydrogen injection system providing hydrogen to the downcomer.

5. The nuclear power plant as recited in claim 1 further comprising a reactor water cleanup system connected to the boiling water reactor.

6. The nuclear power plant as recited in claim 5 wherein the alcohol injection system has an input at the reactor water cleanup system.

7. The nuclear power plant as recited in claim 1 further comprising a noble metals chemistry addition injector connected to the cooling system.

8. The nuclear power plant as recited in claim 7 wherein the noble metal chemistry addition injector injects platinum into the cooling system.

9. The nuclear power plant as recited in claim 1 further comprising sensors sensing a concentration of alcohol or hydrogen, the sensors connected to the controller.

10. The nuclear power plant as recited in claim 1 wherein the boiling water reactor includes a downcomer, the downcomer having an alcohol concentration between about 0.1 to 300 µmol/kg.

11. The nuclear power plant as recited in claim 10 wherein the alcohol concentration is less than 10 µmol/kg.

12. The nuclear power plant as recited in claim 1 further comprising a reductive nitrogen compound injector connected to the cooling system.

13. The nuclear power plant as recited in claim 12 wherein the reductive nitrogen compound injector provides hydrazine or another reductive nitrogen compound to the boiling water reactor at the same time as the alcohol and/or hydrogen.

14. The nuclear power plant as recited in claim 12 wherein the combined concentration of alcohol, hydrogen and reductive nitrogen compound is less than 10 µmol/kg.

15. The nuclear power plant as recited in claim 1 wherein a fuel cladding in the boiling water reactor has an electrochemical potential level of greater than −300 mV.

16. A nuclear power plant comprising:
a boiling water reactor;
a reactor cooling system cooling the boiling water reactor;
an hydrogen water chemistry hydrogen injection system connected to the reactor cooling system;

an alcohol injection system, the alcohol injection system including an alcohol tank and being connected to the reactor cooling system; and a controller controlling the alcohol injection system as a function of hydrogen in the reactor cooling system, the controller controlling injection by the hydrogen water chemistry hydrogen injection system and the alcohol injection system such that a reduction in hydrogen injection into the boiling water reactor is compensated for by injecting an amount of alcohol stoichiometrically equivalent to an amount the hydrogen injection is reduced.

17. The nuclear power plant as recited in claim 16 further comprising a reductive nitrogen compound injector connected to the cooling system, the controller controlling the reductive nitrogen compound injector.

18. The nuclear power plant as recited in claim 17 wherein the controller controls the alcohol injection system and the reductive nitrogen compound injector as a function of hydrogen in the reactor cooling system.

19. A nuclear power plant comprising:
a boiling water reactor;
a reactor cooling system cooling the boiling water reactor;
an hydrogen water chemistry hydrogen injection system connected to the reactor cooling system;
an alcohol injection system connected to the reactor cooling system;
a controller, the controller connected to the alcohol injection system and controlling the alcohol injection system; and
a valve connected to the alcohol injection system, the controller controlling the valve.

20. The nuclear power plant as recited in claim 19 wherein the hydrogen water chemistry hydrogen injection system is connected directly to the reactor cooling system, and the alcohol injection system is connected to the reactor cooling system via a cleanup water system.

21. The nuclear power plant as recited in claim 19 further comprising a reductive nitrogen compound injector connected to the reactor cooling system via a second valve, the controller controlling the second valve.

\* \* \* \* \*